April 16, 1957  D. E. WILLIAMSON  2,788,708
OPTICAL APPARATUS FOR COLLECTING RADIATIONS FROM A FIELD OF VIEW
Filed July 28, 1953
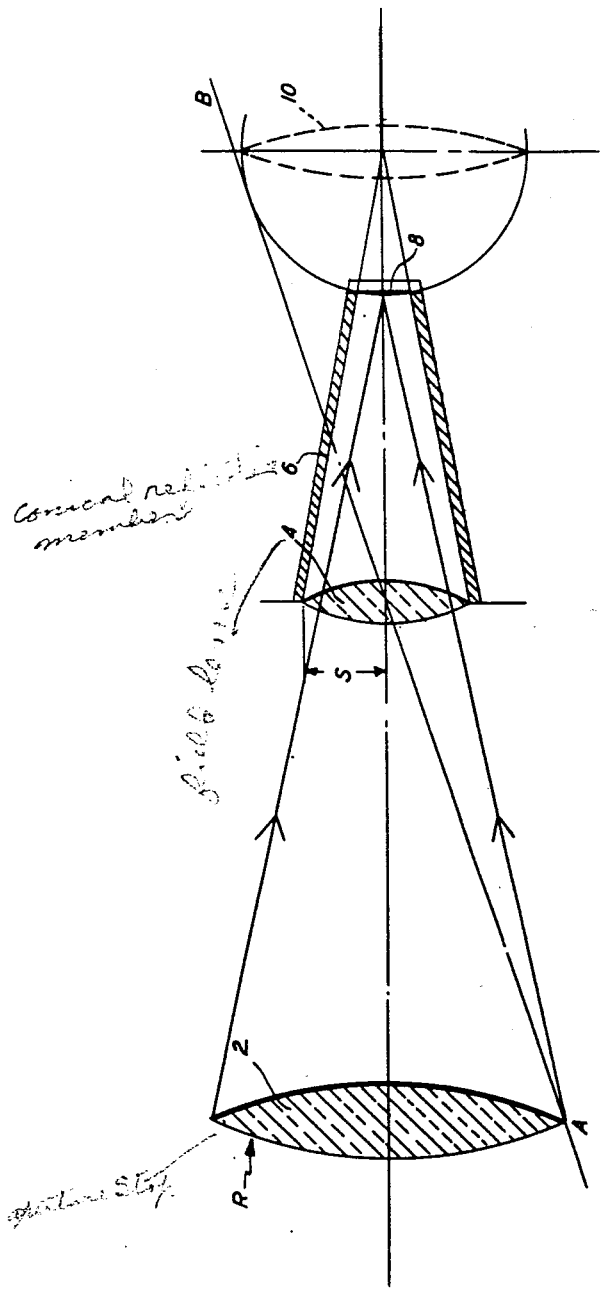
INVENTOR
Donald E. Williamson
BY
ATTORNEY

United States Patent Office 2,788,708
Patented Apr. 16, 1957

2,788,708

OPTICAL APPARATUS FOR COLLECTING RADIATIONS FROM A FIELD OF VIEW

Donald E. Williamson, Lexington, Mass., assignor to Baird Associates, Inc., Cambridge, Mass., a corporation of Massachusetts Application July 28, 1953, Serial No. 370,706

3 Claims. (Cl. 88—57)

This invention relates to an optical apparatus for collecting and condensing radiations from a desired field of view.

In the design of certain types of optical collecting and condensing apparatus there are encountered two somewhat incompatible requirements. It is necessary to provide sharp imagery, on the one hand and, on the other hand, it is important to use the smallest possible area of sensitive detector surface in order to most efficiently utilize the radiation. Good imagery over an extended field of view calls for a system of moderately large $f$/number, whereas the requirement of a relatively small sensitive area in the detecting element calls for a system with an $f$/number approaching the limiting value of an $f$/number of $0.5/n$ where $n$ is the index of refraction of the material in which the cell is mounted.

It is, in general, an object of the present invention to devise an optical radiation collecting apparatus characterized by a primary optical system of adequate $f$/number for a good image, which apparatus is combined with a secondary optical condensing device which will accept light from the image and condense it on a relatively small sensitive area of a detecting element. It is specifically a further object of the invention to devise a means for collecting radiations from a field of view and condensing the radiations on a detecting element of area substantially no greater than that required for an optical system with an $f$/number of $.5/n$.

These and other objects and novel features will be more fully understood and appreciated from the following description of a preferred embodiment of the invention selected for purposes of illustration in the accompanying figure of the drawing, in which the figure noted therein is a diagrammatic view illustrating optical elements arranged in proper relationship to one another to provide the novel radiation collecting and condensing operation of the invention.

In accordance with a preferred embodiment of the invention I have discovered that I may desirably combine an optical system of adequate $f$/number for producing a good image, with an optical condensing apparatus which will accept radiations from the image produced by the optical system and condense these radiations on a sensitive surface of a detecting element of relatively small area in an improved manner.

I have further found that an important feature in thus combining an optical system with an optical condensing apparatus is the use of a conical reflecting surface, arranged in close proximity to and in combination with a field lens.

I have still further determined that another important feature of the combination is the location of the detector element above noted at a predetermined distance from the field lens along the optical axis of the conical reflecting surface and at a point so chosen that the detector surface lies in a common plane with a chord of a circle subtended by the cone reflecting surface, where the center of said circle lies at the intersection of the optical axis of the conical surface and the image of the aperture stop of the system and where the periphery of said circle is tangent to an extreme ray extending from the field lens.

I find that in an optical apparatus of the specific characteristics above defined, I may very desirably employ detector elements, such as bolometers, thermocouples, lead sulfide cells, and various other radiation sensitive devices.

Referring more in detail to the structure shown in the drawings, numeral 2 denotes an aperture stop member which may, for example, consist of an objective or aperture lens of a conventional nature. This lens is arranged in the path of radiations R coming from a field of view, or from some particular object located in said field of view. These radiations R are caused to be converged at the right of the member 2, as shown in the figure, and interposed in the path of these rays at points representing a predetermined focal plane is a field lens or focusing lens member 4, as diagrammatically suggested at the right-hand side of the aperture stop 2.

Also supported in close proximity to the field lens or focusing lens 4 is a conical reflecting member 6 having an inner conical reflecting surface. The larger end of the conical reflecting element 6 is formed with a diameter corresponding to the diameter of the field lens or focusing lens 4, as shown, and it will be observed that all radiations which pass through the field lens or focusing lens 4 are allowed to fall upon the conical reflecting surface, and these radiations are, in a manner described in this invention, condensed by the conical reflecting surface to the theoretically smallest possible area.

At a definite point in the relatively smaller end of the conical element 6 is supported a detector element 8 which may, for example, comprise an infra-red sensitive member, such as a bolometer and which has been shown diagrammatically. This detector element lies on the optical axis of the aperture stop and the field lens or focusing lens and also the image 10 produced by the aperture lens of the aperture stop 2, as has been indicated in dotted lines at the extreme right-hand side of the figure. The optical elements 2 and 4, together with the conical reflecting element 6 and the detector cell 8, are positioned in such relationship with respect to one another that the sensitive surface of the detector element lies in a common plane with a chord of a circle subtended by the cone reflecting surface where the center of the said circle lies at the intersection of the optical axis of the conical reflecting element 6 and the image 10 of the aperture stop 2 produced by the field lens or focusing lens 4, and where the periphery of said circle is tangent to an extreme ray extending from the field lens or focusing lens 4, which ray has been represented by the lines A and B in the drawing.

By the use of an internally reflecting cone lens combination of the class above described and arranged in the particular relationship specified, I have found that it is possible to collect radiations from an object and condense these radiations on a sensitive surface of area no greater than that required for an optical system with an $f$/number of $0.5/n$.

The method and apparatus disclosed may be utilized in various types of radiation observing equipment, such as in connection with the automatic guiding of astronomical telescopes. This guidance may be accomplished by the use of a chopping device located in the image plane of the optical system, the chopping device being so designed that its operation upon the images of small objects, such as a star, produces a signal whose phase may be related to the position of the star in the focal plane. By sensing the chopped radiation with a photo-sensitive device it is possible to employ electrical devices to keep the telescope pointed in the desired direction.

It will be evident from the foregoing description that I have disclosed a novel reflecting cone-lens combination which is capable of serving various useful purposes. Essentially the combination provides for a desired f/number conversion in order to deal with two relative incompatible requirements. The combination also serves to scramble light received from the image plane in such a manner that each point in the image plane produces uniform illumination over the surface of the detector. This feature is important in avoiding the generation of false signals produced by the action of the light chopper in combination with sensitivity variations over the surface of the detecting element.

While I have shown a preferred embodiment of the invention it should be understood that various changes and modifications may be resorted to in keeping with the scope of the invention as defined by the appended claims.

Having thus described my invention, what I desire to claim as new is:

1. An optical apparatus for collecting radiations including the visual range from an object field of view comprising an aperture stop and aperture lens for directing the radiations from said object field of view to converge upon a predetermined plane, a focusing lens supported in said plane to direct said radiations to converge upon a second plane, a conical reflecting element interposed in the path of radiations leaving said focusing lens, said conical reflecting element having the larger diameter thereof corresponding to the diameter of said focusing lens and the smaller diameter thereof corresponding to the diameter of a radiation detector element; a radiation detector element having a sensitive surface for receiving radiations directed through the lenses and the conical reflecting element, said radiation detector element being located along the axis of the conical reflecting element and of the lenses in a position such that the said sensitive surface receives all the radiation passing through a plane normal to the optic axis and contained within a circle subtended by the smaller end of the conical reflector element, the center of said circle lying at the intersection of the optical axis of the lenses and the image of the aperture stop and aperture lens produced by the focusing lens, and the periphery of said circle being tangent to an extreme ray extending from the focusing lens.

2. An apparatus according to claim 1 in which the edge of the aperture lens is the aperture stop.

3. An apparatus according to claim 1 in which the radiation detector element has a sensitive surface of an area substantially that required for an optical system with an f/number of $0.5/n$ for the material of said surface whose index of refraction is $n$.

References Cited in the file of this patent

UNITED STATES PATENTS

| | | |
|---|---|---|
| 1,546,264 | Story | July 14, 1925 |
| 1,644,340 | Keinath | Oct. 4, 1927 |
| 1,699,108 | Halvorson | Jan. 15, 1929 |
| 1,896,830 | Scharff | Feb. 7, 1933 |
| 2,031,971 | Morrissey | Feb. 25, 1936 |
| 2,068,829 | Van Abada | Jan. 26, 1937 |
| 2,252,015 | Machler | Aug. 12, 1941 |
| 2,604,005 | Hahn | July 22, 1952 |
| 2,658,390 | Machler | Nov. 10, 1953 |

FOREIGN PATENTS

| | | |
|---|---|---|
| 591,024 | France | Mar. 31, 1925 |
| 718,310 | Germany | Mar. 9, 1942 |
| 666,523 | Great Britain | Feb. 13, 1952 |
| 687,415 | Great Britain | Feb. 11, 1953 |